(12) United States Patent
Tanaka

(10) Patent No.: US 10,642,444 B2
(45) Date of Patent: May 5, 2020

(54) IMAGE DISPLAY CONTROL DEVICE, AND IMAGE DISPLAY CONTROL METHOD

(75) Inventor: Toshiyuki Tanaka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 558 days.

(21) Appl. No.: 14/357,252

(22) PCT Filed: Sep. 5, 2012

(86) PCT No.: PCT/JP2012/005607
§ 371 (c)(1),
(2), (4) Date: May 9, 2014

(87) PCT Pub. No.: WO2013/009054
PCT Pub. Date: Jul. 4, 2013

(65) Prior Publication Data
US 2014/0365948 A1 Dec. 11, 2014

(30) Foreign Application Priority Data
Dec. 28, 2011 (JP) .................. 2011-289751

(51) Int. Cl.
*G06F 3/0481* (2013.01)
*G06F 3/0483* (2013.01)
(Continued)

(52) U.S. Cl.
CPC ........ *G06F 3/04817* (2013.01); *G06F 3/0482* (2013.01); *G06F 3/0483* (2013.01); *G06F 3/04842* (2013.01); *G06F 2203/04804* (2013.01)

(58) Field of Classification Search
CPC ... G06F 3/0481; G06F 3/0483; G06F 3/04817
See application file for complete search history.

(56) References Cited

U.S. PATENT DOCUMENTS 5,065,347 A * 11/1991 Pajak .................... G06F 3/0481
715/776
5,745,109 A 4/1998 Nakano et al.
(Continued)

FOREIGN PATENT DOCUMENTS

JP 2000-509534 7/2000
JP 2000-242387 9/2000
(Continued)

OTHER PUBLICATIONS

Office Action dated Aug. 21, 2019 in U.S. Appl. No. 15/498,821.
(Continued)

*Primary Examiner* — Phenuel S Salomon
(74) *Attorney, Agent, or Firm* — Wenderoth, Lind & Ponack, L.L.P.

(57) ABSTRACT

An image display control device includes: a first display control unit which displays, on a screen, page images each including an icon; a receiving unit which receives an operation signal indicating a user operation directed to the icon displayed on the screen; and a second display control unit which displays, on the screen, an in-folder-icon image as well as the page images when the receiving unit receives an operation signal for selecting a folder icon, from among a plurality of the icons displayed on the screen, which is associated with one or more of the icons, the in-folder-icon image presenting the one or more icons associated with the selected folder icon.

5 Claims, 16 Drawing Sheets

(51) Int. Cl.
*G06F 3/0484* (2013.01)
*G06F 3/0482* (2013.01)

(56) References Cited

U.S. PATENT DOCUMENTS

| | | | | |
|---|---|---|---|---|
| 5,912,668 | A * | 6/1999 | Sciammarella | G06F 3/04845 715/781 |
| 6,002,403 | A * | 12/1999 | Sugiyama | G06F 3/04815 715/717 |
| 6,005,579 | A * | 12/1999 | Sugiyama | G06F 3/04815 715/788 |
| 6,043,818 | A | 3/2000 | Nakano et al. | |
| 6,127,941 | A * | 10/2000 | Van Ryzin | G08C 17/02 340/12.53 |
| 6,133,918 | A * | 10/2000 | Conrad | G06F 3/0481 715/804 |
| 6,240,421 | B1 * | 5/2001 | Stolarz | G06F 3/0481 |
| 6,377,286 | B1 * | 4/2002 | Hochmuth | G06F 3/04817 715/810 |
| 6,384,869 | B1 * | 5/2002 | Sciammarella | H04N 5/44591 348/564 |
| 6,498,613 | B1 * | 12/2002 | Wajima | G06F 3/0482 715/775 |
| 6,593,938 | B1 * | 7/2003 | Sakata | H04N 1/3875 345/629 |
| 6,593,941 | B1 * | 7/2003 | Sameshima | G06F 3/0482 348/E5.102 |
| 6,661,438 | B1 * | 12/2003 | Shiraishi | G06F 1/1626 715/781 |
| 6,983,426 | B1 | 1/2006 | Kobayashi et al. | |
| 6,993,725 | B2 * | 1/2006 | Somashekaraiah | G06F 3/04897 345/160 |
| 7,409,411 | B2 * | 8/2008 | Sato | G11B 27/105 |
| 7,503,014 | B2 * | 3/2009 | Tojo | G02F 3/0482 715/243 |
| 7,600,192 | B1 | 10/2009 | Hashimoto et al. | |
| 8,230,358 | B1 | 7/2012 | Chaudhri | |
| 8,312,374 | B2 * | 11/2012 | Ozawa | H04N 1/00392 715/702 |
| 8,797,348 | B2 | 8/2014 | Tsuda et al. | |
| 9,218,704 | B2 * | 12/2015 | Lim | G07F 13/065 |
| 9,575,630 | B2 * | 2/2017 | Kouda | H04N 5/23245 |
| 10,088,916 | B2 * | 10/2018 | Miyazawa | G06F 3/0346 |
| 10,198,173 | B2 * | 2/2019 | Wang | G06F 3/0486 |
| 2003/0064757 | A1 | 4/2003 | Yamadera et al. | |
| 2003/0119562 | A1 * | 6/2003 | Kokubo | H04M 1/72522 455/566 |
| 2003/0156140 | A1 * | 8/2003 | Watanabe | G06F 3/0482 715/810 |
| 2003/0169288 | A1 * | 9/2003 | Misawa | G06F 17/3028 715/719 |
| 2004/0100479 | A1 | 5/2004 | Nakano et al. | |
| 2005/0154574 | A1 * | 7/2005 | Takemura | H04L 12/2803 703/22 |
| 2005/0156879 | A1 * | 7/2005 | Honda | H04M 1/72586 345/156 |
| 2005/0278331 | A1 * | 12/2005 | Hatori | G06F 17/3028 |
| 2006/0143574 | A1 * | 6/2006 | Ito | G06F 3/04817 715/800 |
| 2006/0158838 | A1 * | 7/2006 | Kinoshita | H04N 5/4403 361/679.22 |
| 2006/0167838 | A1 * | 7/2006 | Lacapra | G06F 16/1824 |
| 2007/0120846 | A1 | 5/2007 | Ok et al. | |
| 2007/0171450 | A1 * | 7/2007 | Yoshida | G06F 3/04817 358/1.13 |
| 2007/0174780 | A1 * | 7/2007 | Park | G06F 3/0481 715/772 |
| 2007/0192749 | A1 | 8/2007 | Baudisch | |
| 2007/0226652 | A1 * | 9/2007 | Kikuchi | G06F 3/048 715/836 |
| 2008/0129757 | A1 * | 6/2008 | Tanaka | G06F 3/0482 345/660 |
| 2009/0002335 | A1 * | 1/2009 | Chaudhri | G06F 3/04815 345/173 |
| 2009/0125842 | A1 * | 5/2009 | Nakayama | G06F 3/0482 715/835 |
| 2009/0241038 | A1 * | 9/2009 | Izuno | A63F 13/426 715/757 |
| 2009/0278916 | A1 * | 11/2009 | Ito | G06F 3/04815 348/51 |
| 2010/0017731 | A1 * | 1/2010 | Taira | G06F 3/0481 715/765 |
| 2010/0037261 | A1 * | 2/2010 | Ohta | G06F 3/017 725/40 |
| 2010/0134432 | A1 | 6/2010 | Seo | |
| 2010/0223580 | A1 * | 9/2010 | Fujiwara | G06F 3/04817 715/846 |
| 2010/0295789 | A1 * | 11/2010 | Shin | G06F 1/1626 345/168 |
| 2011/0072351 | A1 * | 3/2011 | Shintani | G06F 3/04817 715/730 |
| 2011/0072373 | A1 | 3/2011 | Yuki | |
| 2011/0109541 | A1 * | 5/2011 | Kitagawa | B60K 35/00 345/156 |
| 2011/0161853 | A1 * | 6/2011 | Park | G06F 3/0486 715/769 |
| 2011/0173002 | A1 * | 7/2011 | Fujii | B60R 16/0373 704/246 |
| 2011/0181617 | A1 | 7/2011 | Tsuda et al. | |
| 2011/0252346 | A1 * | 10/2011 | Chaudhri | G06F 3/04817 715/765 |
| 2011/0279363 | A1 * | 11/2011 | Shoji | G06F 3/04886 345/156 |
| 2011/0289448 | A1 * | 11/2011 | Tanaka | G06F 17/30126 715/781 |
| 2011/0292438 | A1 * | 12/2011 | Inami | H04N 1/00413 358/1.15 |
| 2012/0062599 | A1 * | 3/2012 | MacHida | G06F 1/1643 345/655 |
| 2013/0047123 | A1 | 2/2013 | May et al. | |
| 2013/0106690 | A1 * | 5/2013 | Lim | G07F 13/065 345/156 |
| 2014/0320524 | A1 | 10/2014 | Tsuda et al. | |
| 2015/0234573 | A1 * | 8/2015 | Filippov | G06F 3/04842 715/765 |

FOREIGN PATENT DOCUMENTS

| | | |
|---|---|---|
| JP | 2003-303211 | 10/2003 |
| JP | 2007-128509 | 5/2007 |
| JP | 2008-146495 | 6/2008 |
| JP | 2010-128586 | 6/2010 |
| WO | 2000/033571 | 6/2000 |
| WO | 2007/069471 | 6/2007 |
| WO | 2011/038296 | 3/2011 |

OTHER PUBLICATIONS

International Search Report dated Dec. 11, 2012 in International (PCT) Application No. PCT/JP2012/005607.
Office Action dated Jan. 8, 2020 in U.S. Appl. No. 15/498,821.

* cited by examiner

IMAGE DISPLAY CONTROL DEVICE, AND IMAGE DISPLAY CONTROL METHOD

TECHNICAL FIELD

The disclosure relates to an image display control device which controls how to display an icon on a screen.

BACKGROUND ART

One type of conventional information providing device displays an icon and a group icon including multiple icons on a single first screen (see Patent Literature 1, for example). When a user selects a group icon, the information providing device switches a first screen to a second screen and multiple icons included in the group icon are displayed on the second screen. The group icon can manage and organize icons in a hierarchy.

CITATION LIST

Patent Literature

[PTL 1]
WO 2000/033571

SUMMARY OF INVENTION

Technical Problem

The present disclosure provides an image display control device which allows a user to efficiently edit an icon.

Solution to Problem

An image display control device according to the present disclosure includes: a first display control unit which displays, on a screen, page images each including an icon; a receiving unit which receives an operation signal indicating a user operation directed to the icon displayed on the screen; and a second display control unit which displays, on the screen, an in-folder-icon image as well as the page images when the receiving unit receives an operation signal for selecting a folder icon, from among a plurality of the icons displayed on the screen, which is associated with one or more of the icons, the in-folder-icon image presenting the one or more icons associated with the selected folder icon.

It is noted that the present disclosure may be implemented not only as the image display control device that includes the above-described characteristic processing units but also as an image display control method including processes executed by the characteristic processing units, included in the image display control device, as steps. Furthermore, the present disclosure may be implemented as a program to cause a computer to either function as the characteristic processing units included in the image display control device, or execute the characteristic steps included in the image display control method. As a matter of course, the program may be distributed via a non-transitory computer-readable recording medium including a compact disc-read only memory (CD-ROM), and a communications network such as the Internet.

Advantageous Effects of Invention

The present disclosure can provide an image display control device which allows a user to efficiently carry out an icon editing task.

DESCRIPTION OF EMBODIMENT

Figure 1:
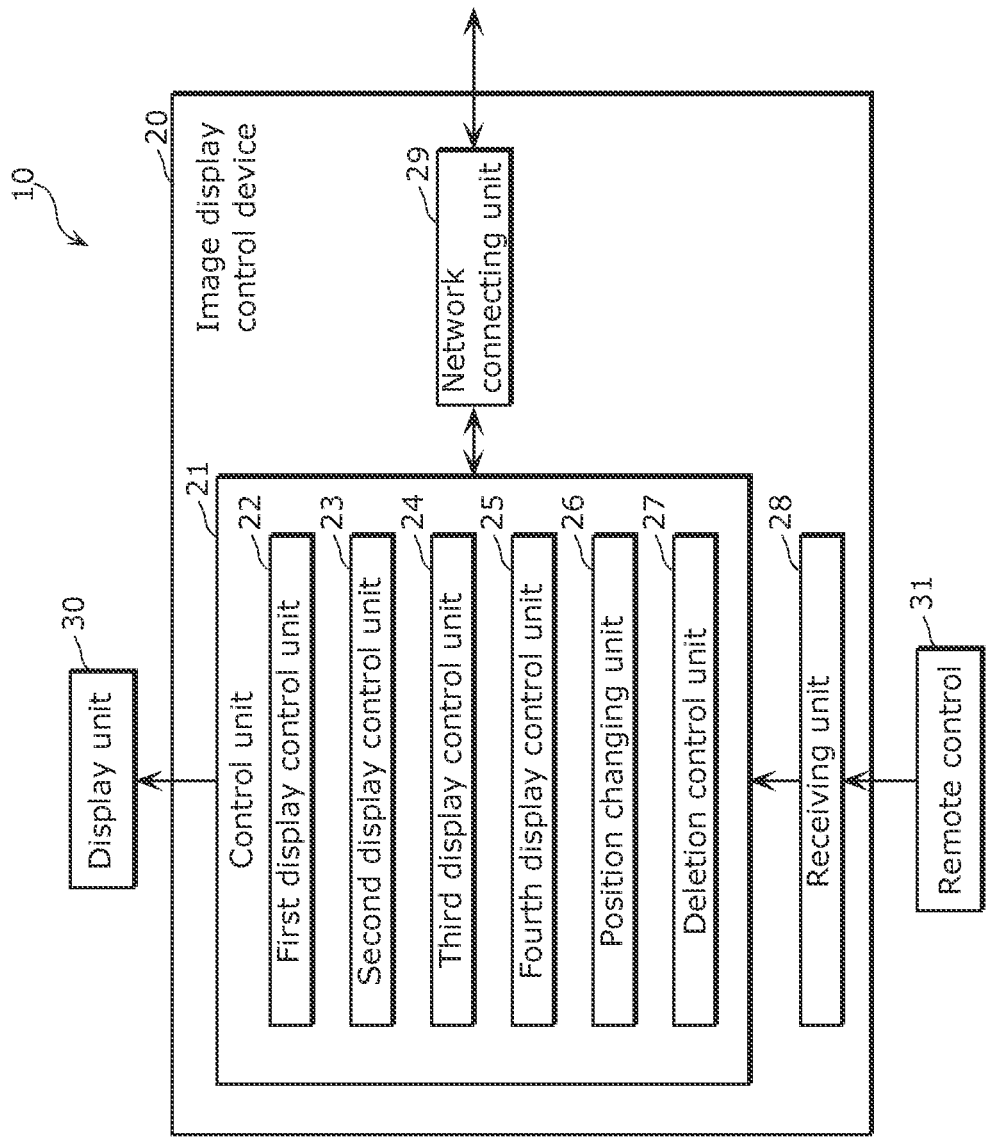
FIG. 1 represents a block diagram illustrating a structure of an image display system according to an embodiment.

An image display control device according to the present disclosure includes: a first display control unit which displays, on a screen, page images each including an icon; a receiving unit which receives an operation signal indicating a user operation directed to the icon displayed on the screen; and a second display control unit which displays, on the screen, an in-folder-icon image as well as the page images when the receiving unit receives an operation signal for selecting a folder icon, from among a plurality of the icons displayed on the screen, which is associated with one or more of the icons, the in-folder-icon image presenting the one or more icons associated with the selected folder icon.

Thanks to the features, multiple page images and an in-folder-icon image are displayed on the screen. This makes it possible to display icons in different hierarchies on the same screen. Hence, the user can efficiently carry out an icon editing task.

For example, the page images each include icon display areas capable of displaying the icons, and the image display control device further includes a third display control unit which, when the receiving unit receives an operation signal for selecting an icon display area which displays no icon, displays a folder icon in the selected icon display area.

Thanks to the features, the user can make a folder icon by simply operating a directional key to move a cursor to an icon display area with no icon displayed and pressing an enter key. Hence, the user can efficiently carry out an icon editing task using an input apparatus such as a remote control equipped with limited keys.

Moreover, the third display control unit may further display, on the screen, an image for entering a name by a user, and designate a name, which is entered by the user and identified by an operation signal received by the receiving unit, as a name of the folder icon displayed in the selected icon display area.

Thanks to the features, the user can name a folder icon.

For example, the above image display control device includes a fourth display control unit which displays, on the screen, an icon list image presenting a list of the icons displayable on the screen.

In addition, when the receiving unit receives an operation signal for selecting an icon from among the icons in the icon list image and the selected icon is associated with a folder icon, (i) the first display control unit may further highlight the folder icon associated with the selected icon and included in the page images, and (ii) the second display control unit may further display the in-folder-icon image of the highlighted folder icon.

When the user selects an icon included in the icon list image, such features allow the folder icon including the selected icon to be highlighted. Hence, the user can easily find out that the icon is included in which folder icon on which page image.

For example, the above image display control device further includes a position changing unit which switches display positions between two of the icons on the screen when the receiving unit receives an operation signal for selecting one of the two icons and then an other one icon, the icons being displayed in the page images and in the icon list image.

Thanks to the features, the user can switch the display positions of two icons through a simple operation to successively select the two icons. Hence, the user can efficiently change the display position of an icon using an input apparatus such as a remote control equipped with limited keys.

Moreover, the position changing unit may further move, on the screen, one of the icons to one of the icon display areas which displays no icon, when the receiving unit receives an operation signal for selecting the one icon and then the one icon display area, the icons being displayed in the page images and in the icon list image, and the icon display areas being capable of displaying the icons in the page images and in the icon list image.

Thanks to the features, the user can move an icon through a simple operation to select the icon and then an empty area. Hence, the user can efficiently change the display position of an icon using an input apparatus such as a remote control equipped with limited keys.

In addition, the position changing unit may further move, on the screen, one of the icons to the in-folder-icon image, when the receiving unit receives an operation signal indicating an operation which keeps selecting the one icon for a certain period of time or longer, the icons being displayed in the page images while the in-folder-icon image is displayed.

Thanks to the features, the user can move an icon to the in-folder-icon image by operating a directional key to move a cursor to the icon in a page image and then holding an enter key pressed. Hence, the user can efficiently change the display position of an icon using an input apparatus such as a remote control equipped with limited keys.

Moreover, the position changing unit may further move, on the screen, one of the icons to one of the icon display areas which displays no icon, when the receiving unit receives an operation signal indicating an operation which keeps selecting the one icon in the in-folder-icon image for a certain period of time or longer, the icon display areas being capable of displaying the icons in the page images.

Thanks to the features, the user can move an icon to an empty area in a page image by operating a directional key to move a cursor to the icon in an in-folder-icon image and then holding an enter key pressed. Hence, the user can efficiently change the display position of an icon using an input apparatus such as a remote control equipped with limited keys.

Moreover, when the receiving unit receives an operation signal for selecting a name of a folder icon included in the in-folder-icon image, the second display control unit may further display, on the screen, an image for entering a name by a user, and designate a name, which is entered by the user and identified by an operation signal received by the receiving unit, as a name of the folder icon.

Thanks to the features, the user can change the name of a folder icon.

In addition, the image display control device further may include a deletion control unit which deletes from the screen a folder icon displayed on the screen, when the receiving unit receives an operation signal for indicating an operation which keeps selecting the one folder icon for a certain period of time or longer.

Thanks to the features, the user can delete a folder icon by operating a directional key to move a cursor to the folder icon and then holding an enter key pressed. Hence, the user can efficiently delete a folder icon using an input apparatus such as a remote control equipped with limited keys.

Described hereinafter is an embodiment, with reference to the drawings as necessary. It is noted that undue details may be omitted. Exemplary details to be omitted include already-known issues and overlapping details between substantially the same features. This is to avoid unnecessary redundancy in the description below and facilitate understanding of persons skilled in the art.

It is noted that the inventor has provided the drawings and the description below, so that persons skilled in the art will thoroughly understand the present disclosure. The drawings and the description shall not limit the subject-matter recited in the claims.

[1-1 Structure]

FIG. 1 represents a block diagram illustrating a structure of an image display system 10 according to an embodiment.

The image display system 10 is used for displaying an image including an icon and editing the icon. The image display system 10 includes a display unit 30, an image display control device 20, and a remote control 31.

The display unit 30 includes a display and so on, and displays an image on a screen.

The image display control device 20 executes control for displaying on the display unit 30 an image including an icon. More specifically, the image display control device 20 downloads through a network connecting unit 29 application software (hereinafter simply referred to as "application") to be executed on the image display control device 20. The image display control device 20 then executes control for displaying, on the screen of the display unit 30, an icon indicating the downloaded application. The image display control device 20 carries out an icon editing task including creating an icon and moving the position of an icon, by following a user operation via the remote control 31. Specifically, the image display control device 20 is one of the following application-executable devices: a recording appliance such as a hard-disk drive recorder, a TV, and a personal digital assistance.

The remote control 31 wirelessly transmits the image display control device 20 an operation signal indicating a user operation.

Figure 2:
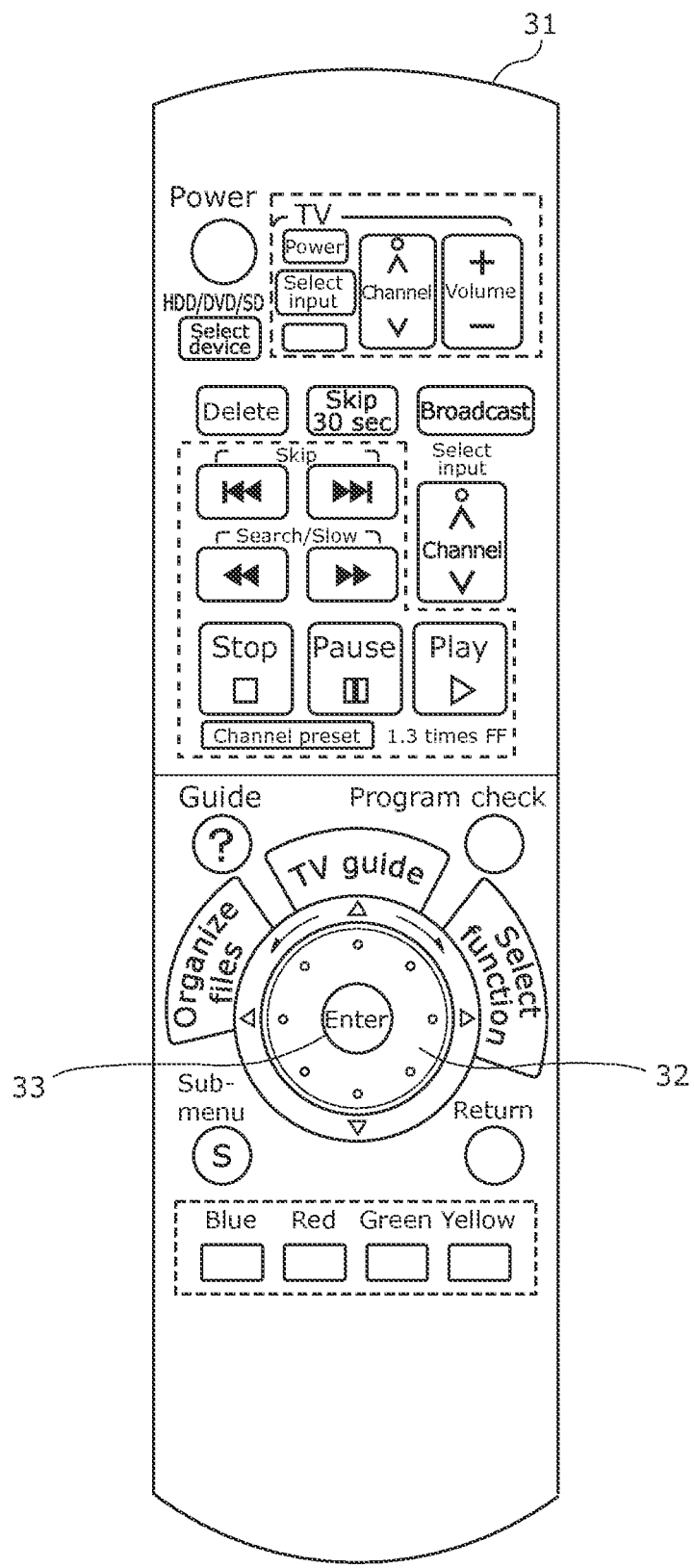
FIG. 2 represents an appearance diagram of a remote control.

FIG. 2 represents an appearance diagram of the remote control 31.

The remote control 31 includes a directional key 32 for moving a cursor and an enter key 33 for determining an operation, as well as a button for operating the channels on the TV and a button for operating the recording appliance.

The image display control device 20 includes the network connecting unit 29, a receiving unit 28, and a control unit 21.

The network connecting unit 29 is a communications appliance including a network interface card and so on for connecting the image display control device 20 to networks such as the Internet and a local area network (LAN).

The receiving unit 28 receives an operation signal to be transmitted from the remote control 31. Specifically, the receiving unit 28 receives from the remote control 31 an operation signal indicating a user operation directed to an icon displayed on the screen of the display unit 30.

The control unit 21 displays on the display unit 30 an icon indicating the application downloaded by the network connecting unit 29, and carries out an icon editing task in response to the operation signal received by the receiving unit 28.

The control unit 21 includes a first display control unit 22, a second display control unit 23, a third display control unit 24, a fourth display control unit 25, a position changing unit 26, and a deletion control unit 27.

The first display control unit 22 displays, on the screen of the display unit 30, multiple page images each including an icon.

The second display control unit 23 displays, on the screen of the display unit 30, an in-folder-icon image presenting at least one icon associated with a folder icon which is a kind of icon.

When the receiving unit 28 receives an operation signal for selecting an icon display area which displays no icon, the third display control unit 24 displays a folder icon in the selected icon display area. It is noted that, the icon display area is capable of displaying an icon included in each of the page images.

The fourth display control unit 25 displays, on the screen of the display unit 30, an icon list image presenting a list of icons displayable on the screen.

The position changing unit 26 changes the display position of an icon on the screen of the display unit 30.

The deletion control unit 27 deletes, from the screen of the display unit 30, an icon displayed on the screen.

Detailed hereinafter are operations of the image display control device 20, with reference to the drawings.

Figure 3:
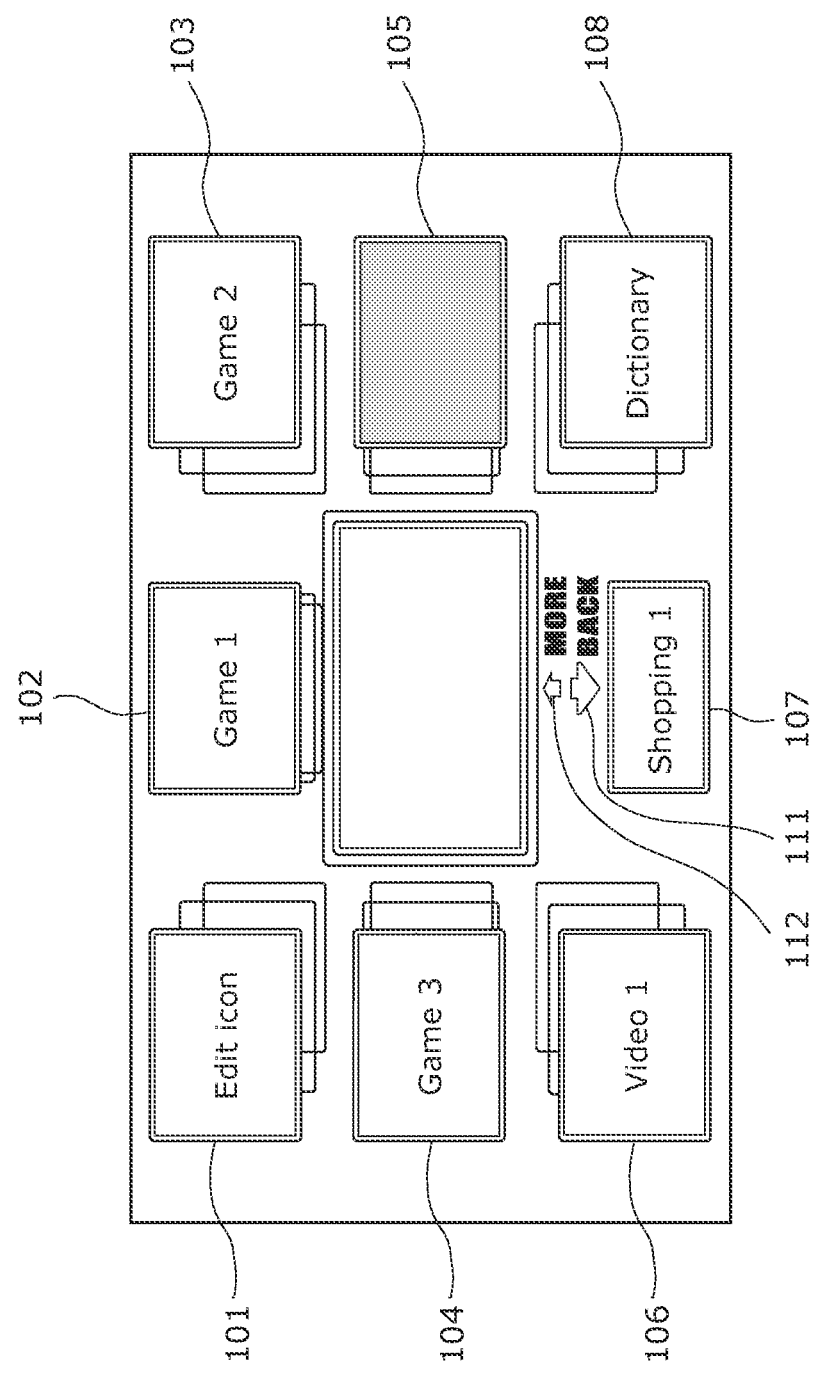
FIG. 3 represents an example of an operating screen displayed on a display unit in an initial state.

FIG. 3 represents an example of a screen (hereinafter referred to as "operating screen") displayed in the initial state by the control unit 21 on the display unit 30. The operating screen displays icons 101 to 108 included in a given page. Each of the icons is associated with an application. For example, each of the icons 102 to 104 is associated with a game application. The icon 101 is associated with an application for icon editing tasks.

In order to switch the page displayed on the operating screen, the user operates the directional key 32 on the remote control 31 to move the cursor to a button 111 or a button 112, and presses the enter key 33. In response to an operation signal transmitted via such an operation, the control unit 21 switches pages and displays on the display unit 30 an icon included in the page switched to. In other words, the user can look for a desired icon while switching pages, and execute a desired application.

Figure 4:
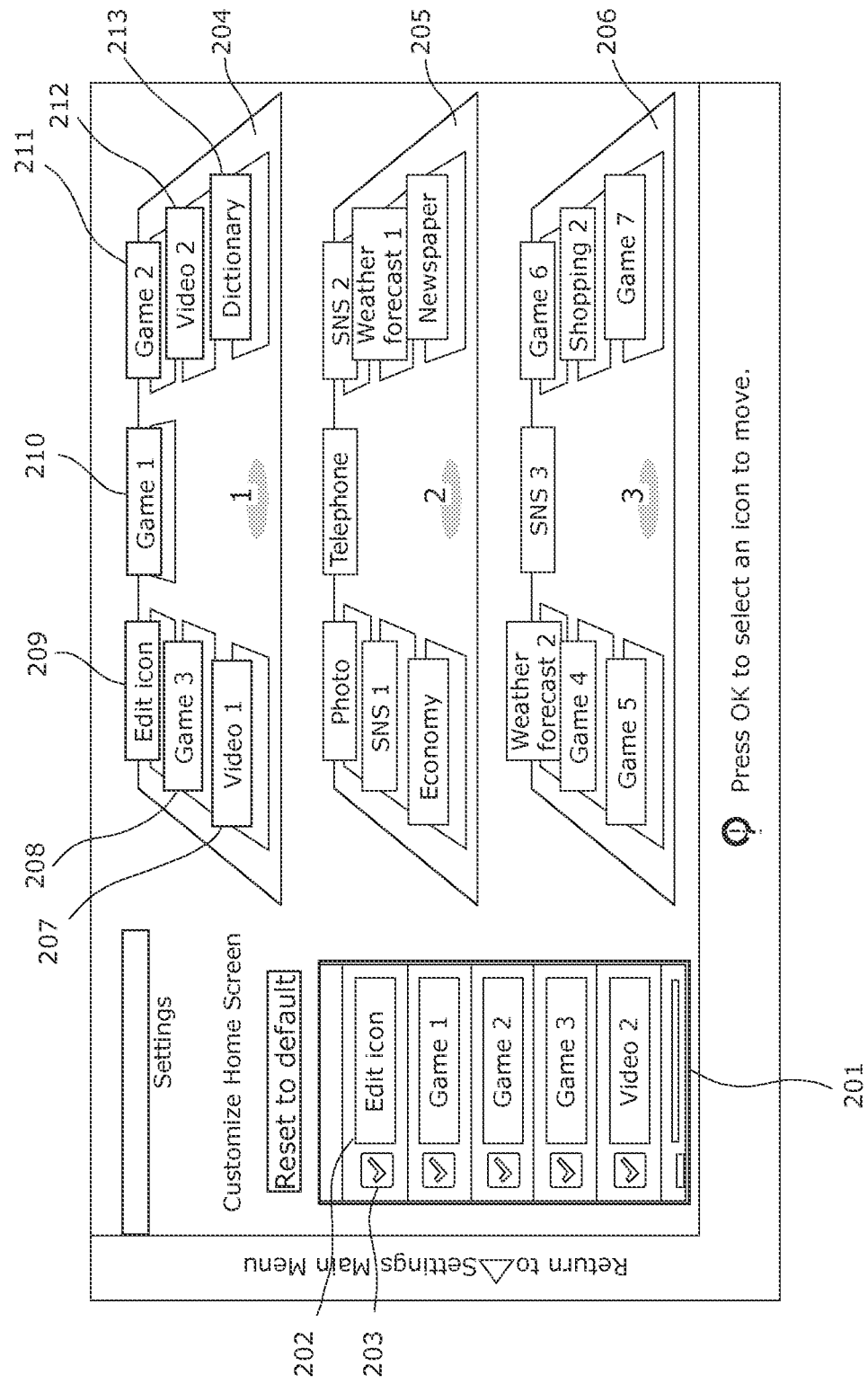
FIG. 4 represents an example of an editing screen which is a screen for an icon editing task.

When the user executes the application indicated by the icon 101, the control unit 21 displays, on the display unit 30, a screen (hereinafter referred to as "editing screen") for icon editing tasks as represented in FIG. 4. In other words, the first display control unit 22 displays page images 204 to 206 on the editing screen. The fourth display control unit 25 displays an icon list image 201 on the editing screen. The page image 204 includes icons 207 to 213. Similar to the page image 204, each of the page images 205 and 206 includes multiple icons. FIG. 4 shows three page images alone. In order to display the fourth page image and after, the user operates the directional key 32 of the remote control 31 downward. When the user operates the directional key 32 downward while the cursor is pointing to a bottom icon on the page image 206, the first display control unit 22 scrolls down to a succeeding page image. Such an operation makes it possible to display the fourth page image and after. It is noted that when the user scrolls images to redisplay a page image disappeared from the editing screen, the user can scroll up to a preceding page image by operating the directional key 32 upward.

The icon list image 201 includes an icon 202 and a check box 203 for selecting whether or not the icon 202 is to be displayed on the page image. The icon list image 201 displays all the icons registered in the image display control device 20. When the user checks the check box 203, the icon 202 that is associated with the check box 203 is displayed on a given page image. When the user checks the check box 203 for the icon 202, for example, the icon 209 is displayed on the page image 204. Selection and deselection of the check box 203 are made as described below. When the user operates the directional key 32 of the remote control 31 to move the cursor to the positions of the check box 203 and the icon 202 and presses the enter key 33, the user makes a binary selection between on and off as a toggle. It is noted that when the user displays an undisplayed icon on the icon list image 201, the user may operate the directional key 32 upward or downward as does so for page images. Such a feature allows the user to scroll and display an icon within the icon list image 201.

[1-2. Operations]

Figure 5A:
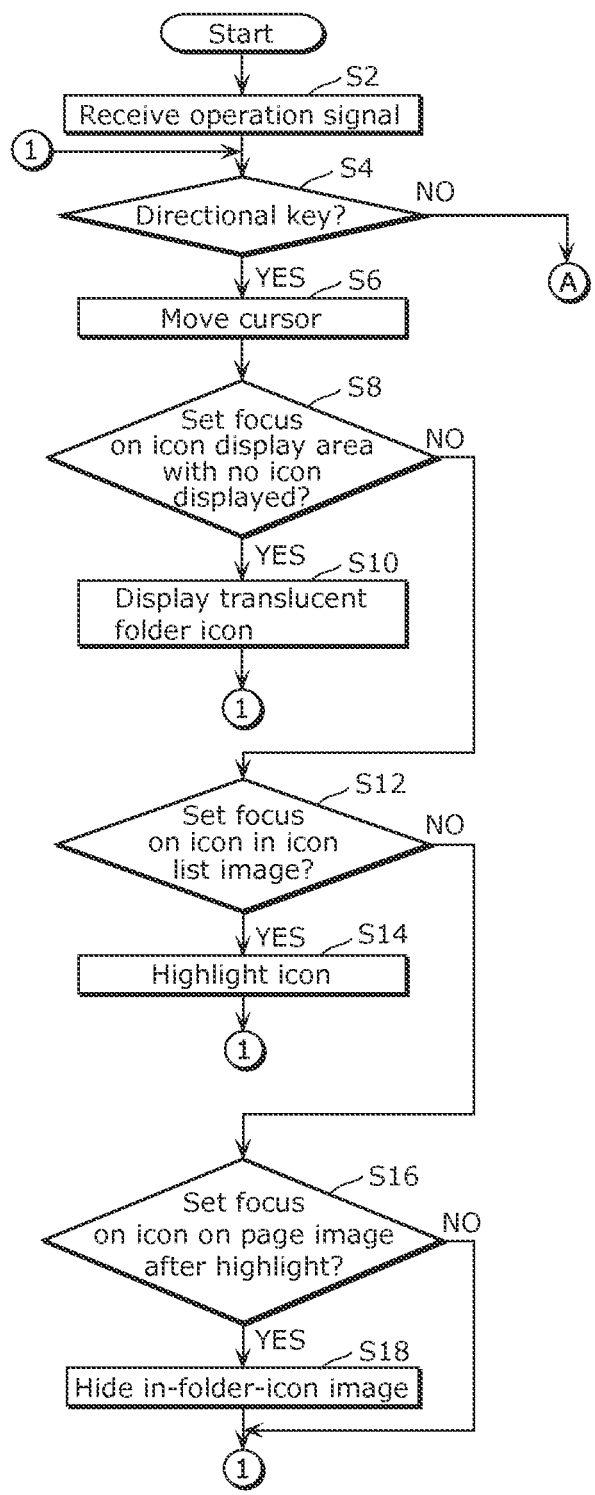
FIG. 5A represents a flowchart depicting processes executed by the image display control device when the editing screen is displayed.
Figure 5B:
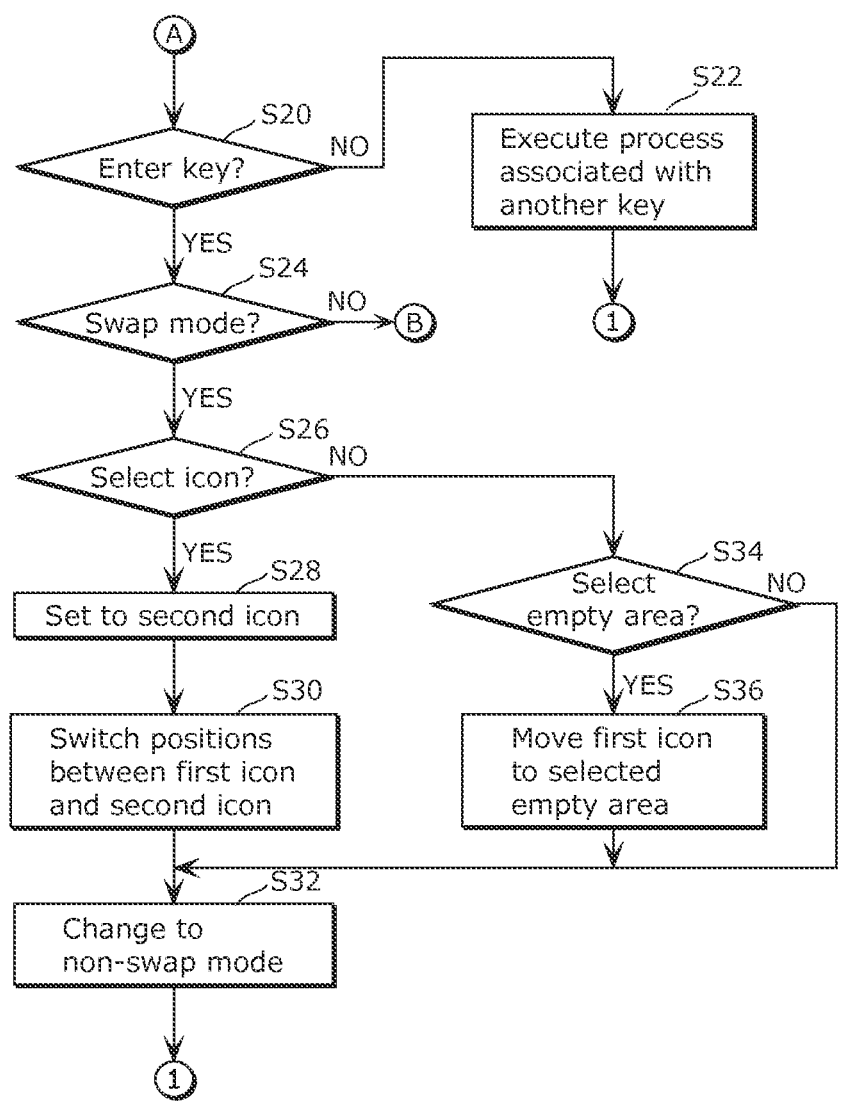
FIG. 5B represents a flowchart depicting processes executed by the image display control device when the editing screen is displayed.
Figure 5C:
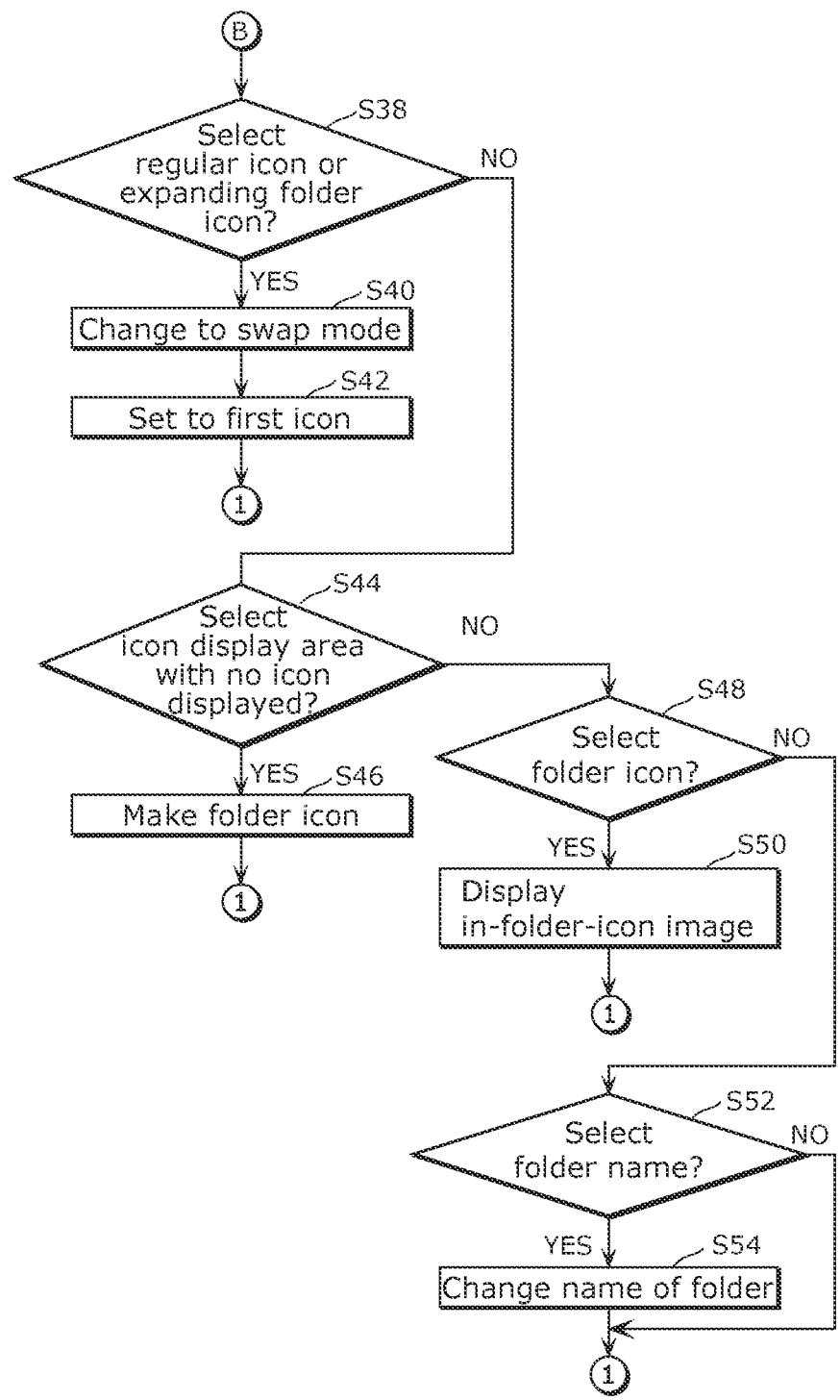
FIG. 5C represents a flowchart depicting processes executed by the image display control device when the editing screen is displayed.

FIGS. 5A to 5C represent flowcharts depicting processes executed by the image display control device 20 when the editing screen is displayed.

Described next is how to edit a folder, with reference to the flowcharts in FIGS. 5A to 5C and exemplary editing screens.

It is noted that the image display control device 20 is to be set to one of a swap mode and a non-swap mode. The swap mode and the non-swap mode shall be described later. In the initial state, the image display control device 20 is in the non-swap mode.

The receiving unit 28 receives an operation signal from the remote control 31 (S2).

If the received operation signal is the operation signal transmitted from the remote control 31 by the user pressing the directional key 32 (S4: YES), the control unit 21 moves the cursor on the editing screen in a direction in which the directional key is pressed (S6).

[1. Creating a Folder]

Figure 6:
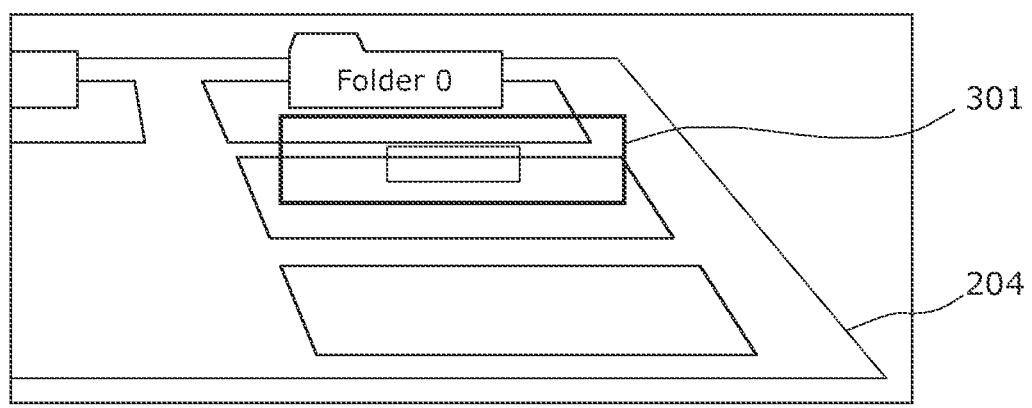
FIG. 6 represents a portion of a page image.

FIG. 6 represents a portion of the page image 204. For example, if a cursor 301 moves to an icon display area with no icon displayed and sets focus on the position (S8: YES), the third display control unit 24 displays a translucent folder icon in the focused icon display area (S10).

Here, if the user presses the enter key 33 of the remote control 31 (S20: YES, S24: NO, S38: NO, and S44: YES), the third display control unit 24 displays, on the screen, a name entering image 311 represented in FIG. 7. The user operates the directional key 32 and the enter key 33 on the name entering image 311 in order to name the folder icon, and the third display control unit 24 displays the named folder icon on the focused icon display area (S46). Such processes make a new folder icon.

[Highlighting an Icon]

Figure 8:
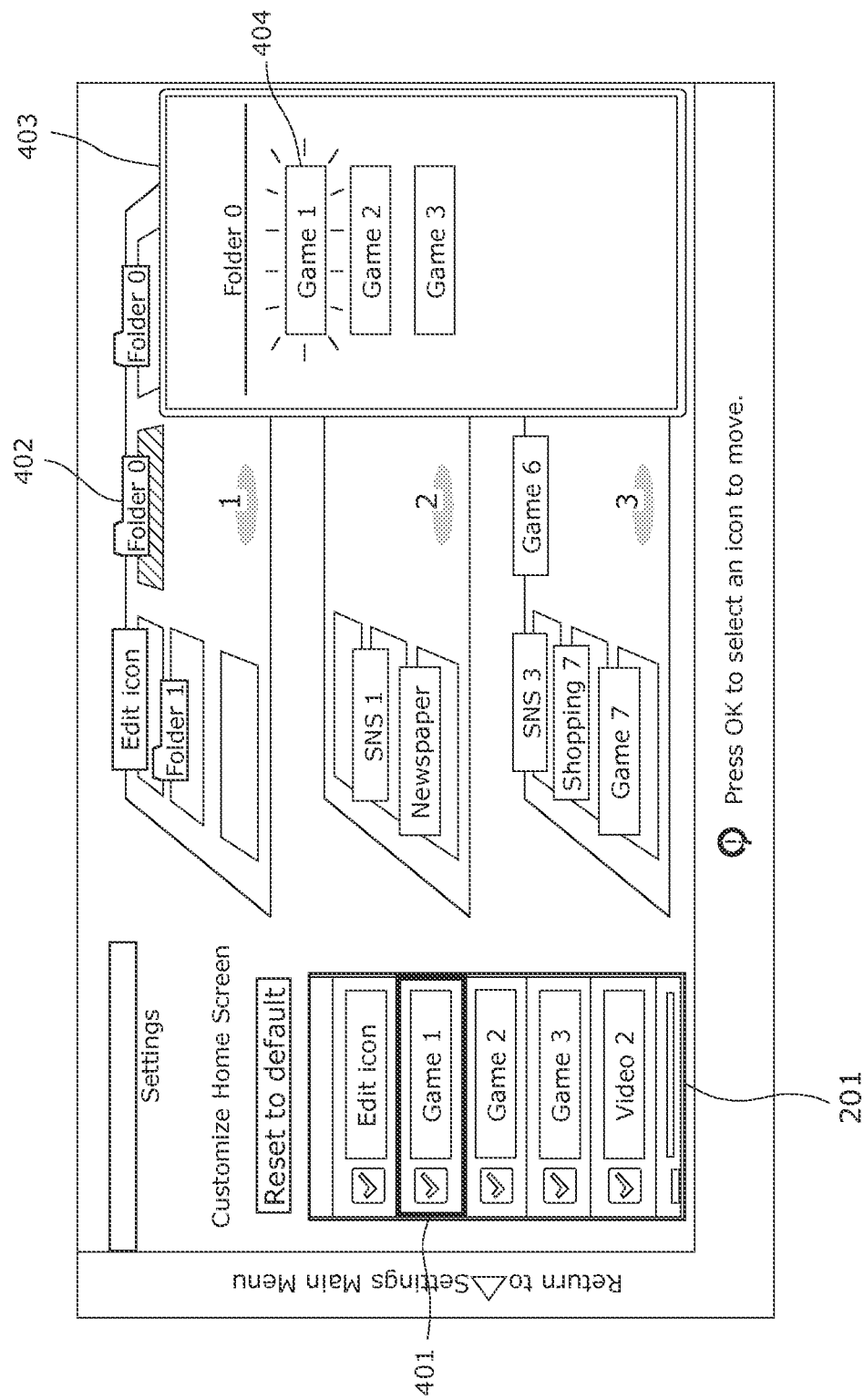
FIG. 8 represents an example of how to highlight an icon.

FIG. 8 represents an example of how to highlight an icon. For example, if the user operates the directional key 32 of the remote control 31 to move a cursor 401 to an icon in the icon list image 201 so that the cursor 401 sets focus on the position (S12: YES), the first display control unit 22 highlights a folder icon 402 including the focused icon. For example, the first display control unit 22 presents the background of the folder icon 402 brighter than that of another icon. In addition, the second display control unit 23 displays an in-folder-icon image 403 to display therein icons included in the folder icon 402. Then, the second display control unit 23 highlights an icon 404 which is the same as the icon that the cursor 401 locates (S14). For example, the second display control unit 23 presents the background of the icon 404 brighter than that of another icon. It is noted that when a target folder icon 402 to be highlighted is not displayed on the screen, the first display control unit 22 scrolls page images and highlights a target folder icon 402 on the screen. In the case where the icon 404 is not displayed on the in-folder-icon image 403, as well, the second display control unit 23 scrolls icons and highlights the target icon 404 on the in-folder-icon image 403.

Figure 9:
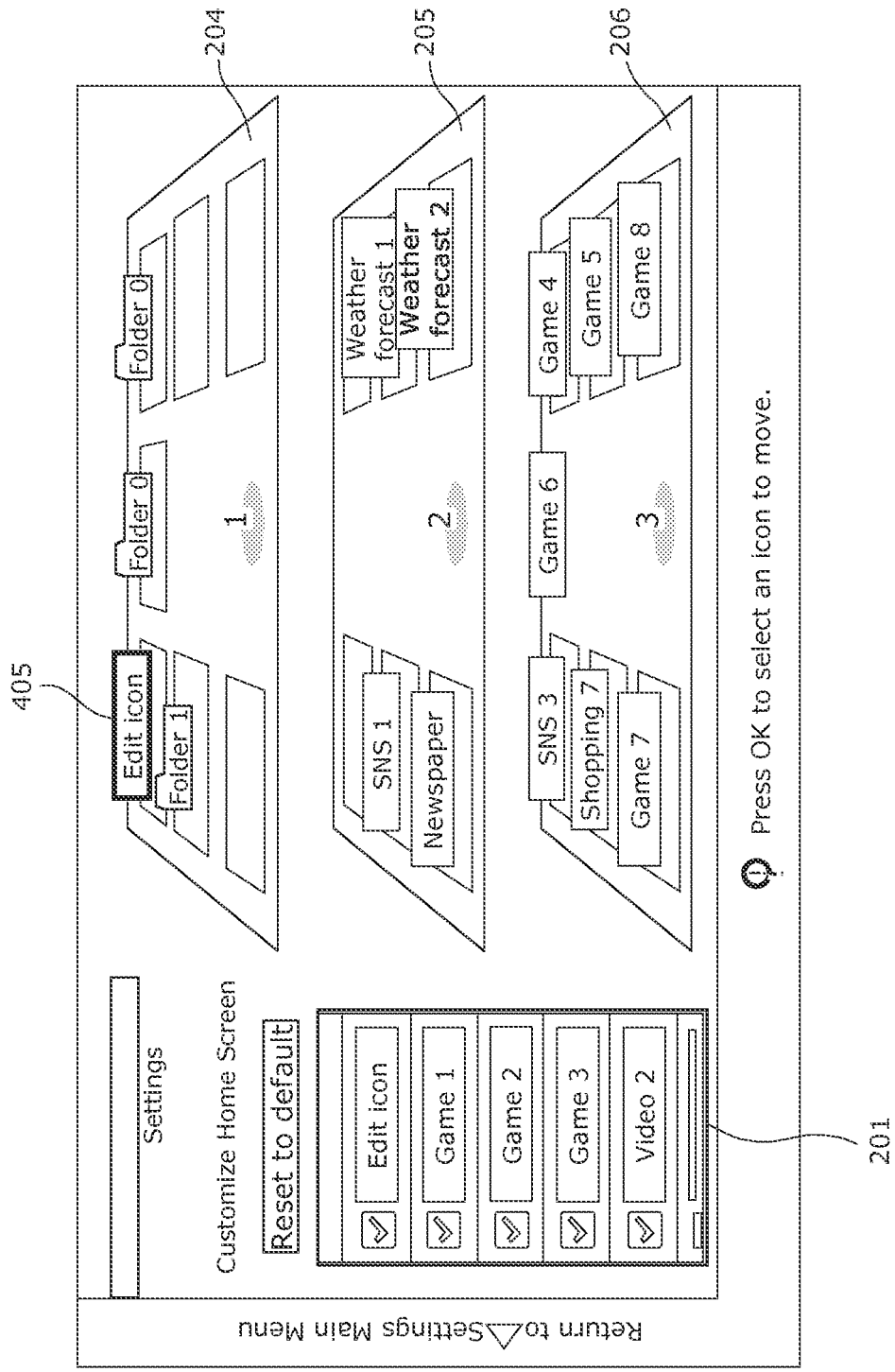
FIG. 9 represents an example of the editing screen when no in-folder-icon image is displayed.

In the state of FIG. 8, when the user operates leftward the directional key 32 of the remote control 31 (S4: YES), a cursor 405 moves to the position of the top-left icon on the page image 204 as represented in FIG. 9 (S6). In addition, the second display control unit 23 hides the in-folder-icon image 403 (S8: NO, S12: NO, S16: YES, and S18).

[3. Expanding a Folder Icon]

Figure 10:
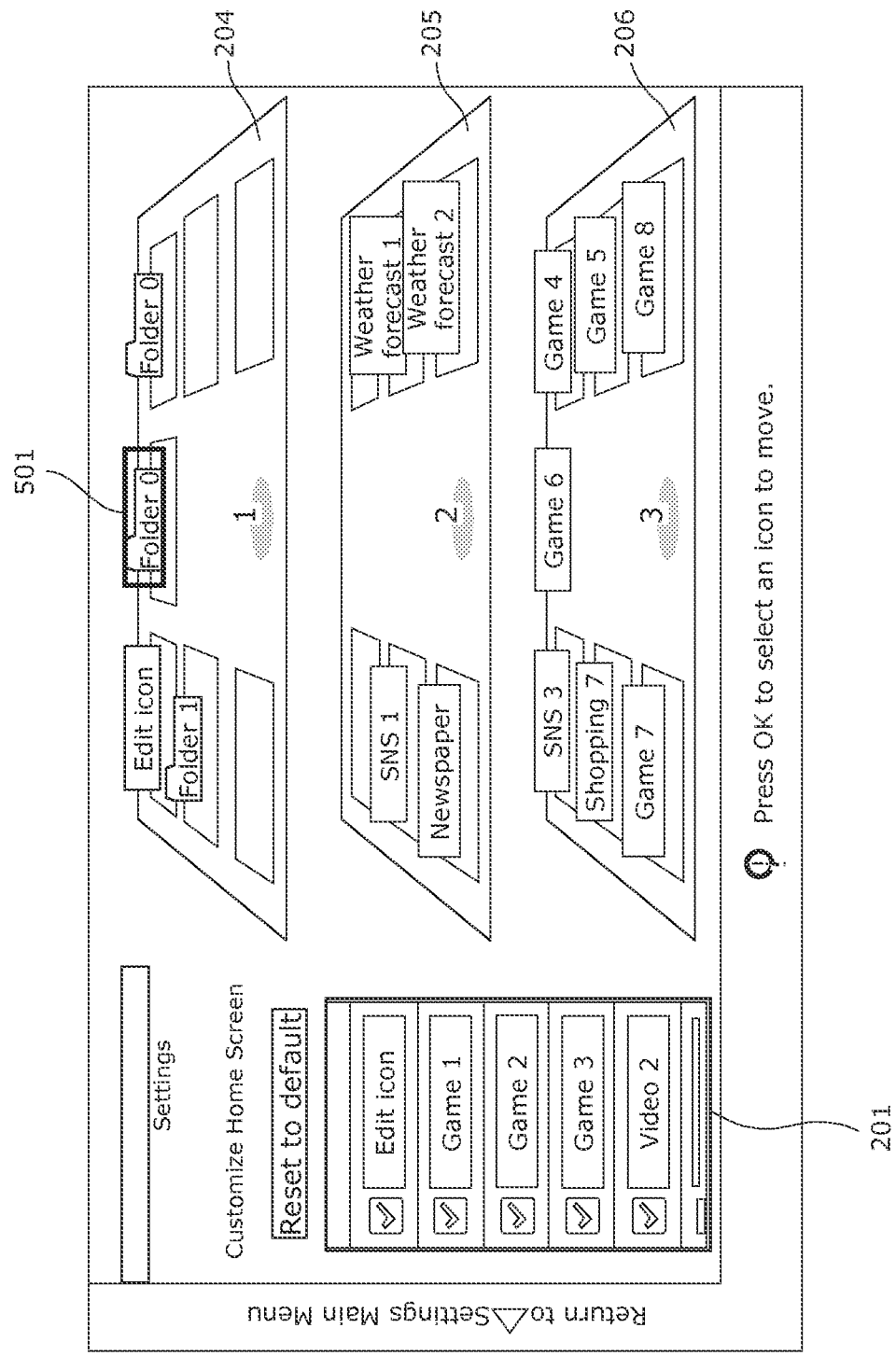
FIG. 10 represents an example of a screen when a cursor is placed on a folder icon.
Figure 11:
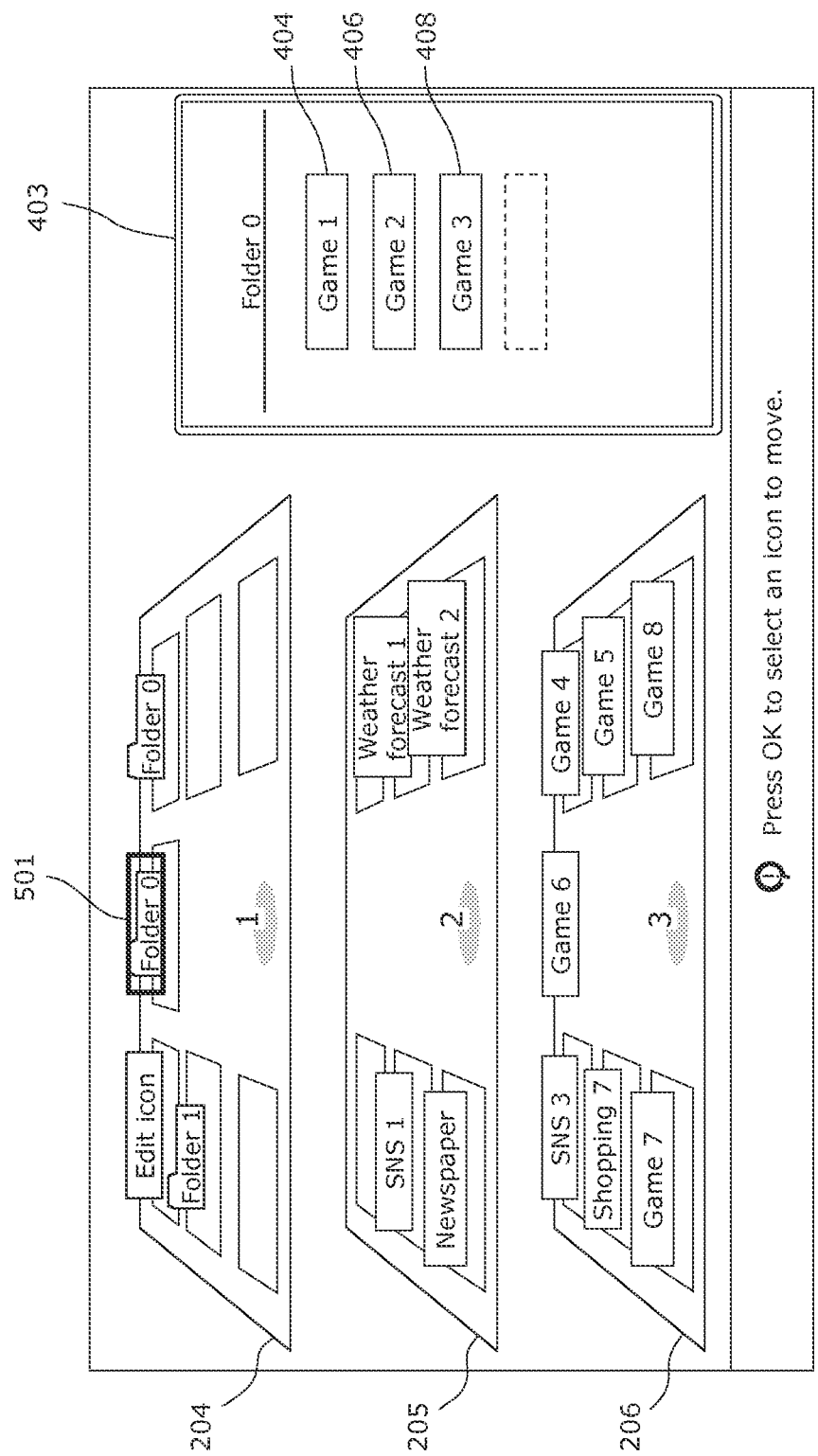
FIG. 11 represents an example of a screen when the in-folder-icon image is displayed.

FIG. 10 represents a case where a cursor 501 is positioned on a folder icon. In the state of FIG. 9, for example, when the user operates rightward the directional key 32 of the remote control 31 (S4: YES), a cursor 501 moves right as represented in FIG. 10 (S6). Here, if the user presses the enter key 33 of the remote control 31 (S20: YES, S24: NO, S38: NO, S44: NO, and S48: YES), the second display control unit 23 displays the in-folder-icon image 403 on the screen as represented in FIG. 11 (S50). The in-folder-icon image 403 includes icons 404 to 408 included in a folder icon which the cursor 501 locates. The first display control unit 22 shifts leftward the display positions of the page images 204 to 206 by the predetermined number of pixels, in order to secure the display area of the in-folder-icon image 403.

[4. Moving an Icon]

Figure 12:
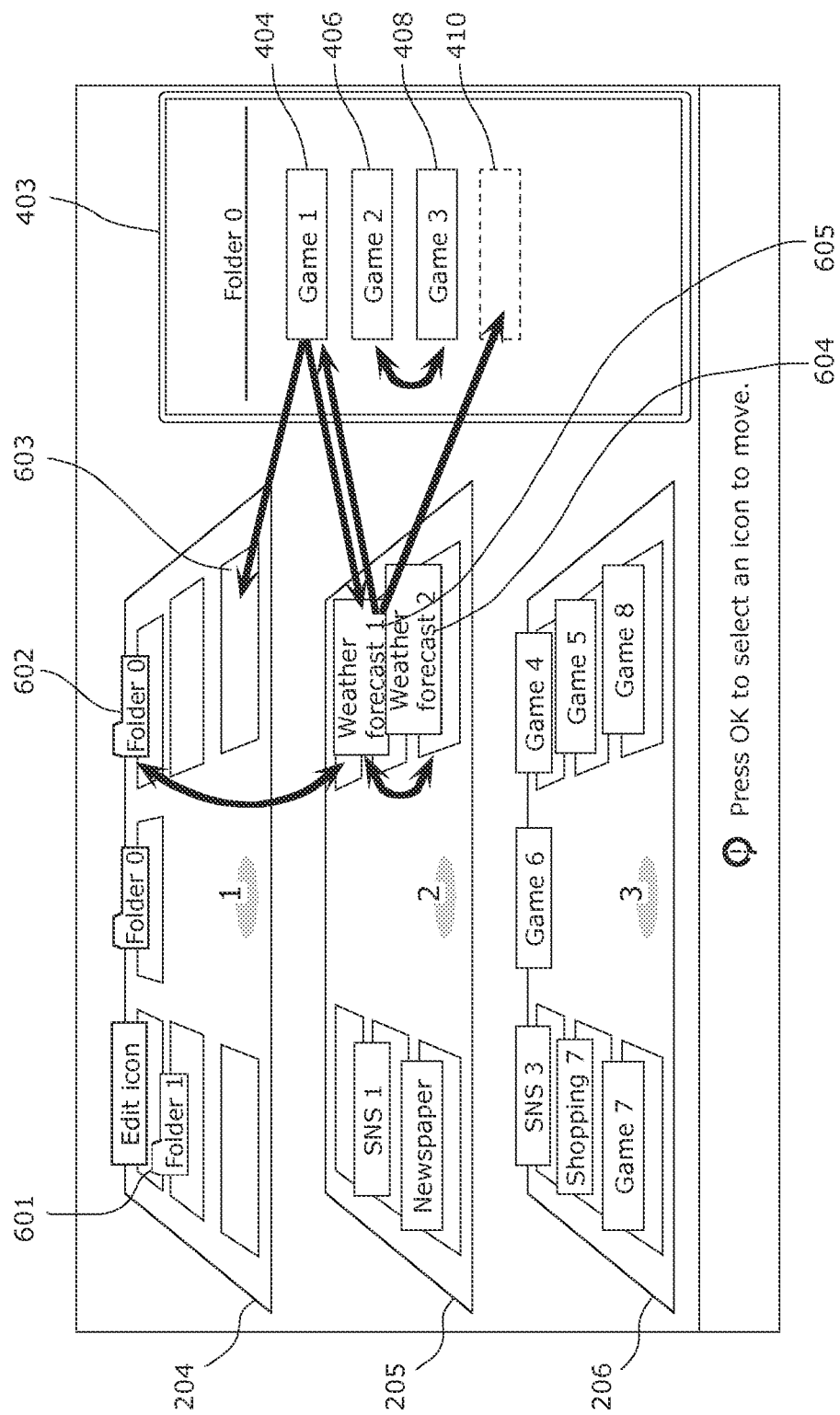
FIG. 12 represents how to move an icon.

FIG. 12 represents how to move an icon.

Described first is how to switch display positions between two icons. Two icons switch their display positions when one of the icons is selected and then the other icon is selected. Exemplified is how to switch display positions between an icon 604 and an icon 605 on the page image 205.

The user operates the directional key 32 of the remote control 31 to move a cursor onto an icon 604, and presses the enter key 33 (S20: YES, S24: NO, and S38: YES). Then, the image display control device 20 changes to the swap mode (S40). The swap mode is the state where an icon to move is selected. The image display control device 20 can be set to the other mode—that is the non-swap mode. The non-swap mode is the state where an icon to move is not selected. After changing to the swap mode, the position changing unit 26 designates a selected icon 604 as a first icon (S42). Next, the user operates the directional key 32 of the remote control 31 to move a cursor onto an icon 605, and presses the enter key 33 (S20: YES, S24: YES, and S26: YES). Then, the position changing unit 26 designates the selected icon 605 as a second icon (S28), and switches, on the screen, the display positions of the selected icon 604 designated as the first icon and the icon 605 designated as the second icon (S30). Then, the image display control device 20 changes to the non-swap mode (S32). Such operations make it possible to switch display positions of two icons. It is noted that icons to be switched shall not be limited to regular icons; instead, those icons may be folder icons.

Described below is how to switch display positions between a folder icon 602 and the icon 605. Exemplified here is a case where a folder icon 602 is selected and then the icon 605 is selected so that the display positions of the two icons switch. If the user operates the remote control 31 to move a cursor onto a folder icon 602 and presses the enter key 33 when the in-folder-icon image 403 is not displayed (S20: YES, S24: NO, S38: NO, S44: NO, and S48: YES), the second display control unit 23 displays the in-folder-icon image 403 as represented in FIG. 12 (S50). Here, if the user presses the enter key 33 of the remote control 31 again (S20: YES, S24: NO, and S38: YES), the image display control device 20 changes to the swap mode (S40). After changing to the swap mode, the position changing unit 26 designates the selected folder icon 602 as the first icon (S42). Next, the user operates the directional key 32 of the remote control 31 to move the cursor onto the icon 605, and presses the enter key 33 (S20: YES, S24: YES, and S26: YES). Then, the position changing unit 26 designates the selected icon 605 as the second icon (S28), and switches, on the screen, the display positions of the folder icon 602 designated as the first icon and the icon 605 designated as the second icon (S30). After that, the image display control device 20 changes to the non-swap mode (S32). Such operations make it possible to switch the display positions between the folder icon 602 and the icon 605. The display positions can be switched when the icon 605 is selected first, followed by the folder icon 602.

Icons whose positions are switchable shall not be limited to two of the icons on a page image; instead, the switchable icons may be two of the icons in the in-folder-icon image 403 and may be an icon on a page image and another icon in the in-folder-icon image 403. For example, the user can switch the icon 406 and the icon 408 both included in the in-folder-icon image 403. Furthermore, the user can switch the icon 605 on the page image 205 and the icon 404 in the in-folder-icon image 403. In other words, as soon as either a regular icon or a folder icon displayed in the in-folder-icon image 403 is selected (S38: YES), the image display control device 20 changes to the swap mode (S40). The selected icon is designated as the first icon (S42). The icon selected next is designated as the second icon (S26: YES, and S28). The display positions between the first and the second icons switch (S30). The image display control device 20 changes to the non-swap mode (S32). Such operations make it possible to switch the display positions of two icons.

Described next is how to move an icon to an empty area. An icon moves to an empty area when the user selects the icon and then selects the empty area with no icon located. Exemplified here is a case where the icon 404 is moved to an icon display area 603 found on the page image 204 and displaying no icon. The user operates the directional key 32 of the remote control 31 to move a cursor onto the icon 404, and presses the enter key 33 (S20: YES, S24: NO, and S38: YES). Then, the image display control device 20 changes to the swap mode (S40). After changing to the swap mode, the position changing unit 26 designates the selected icon 404 as the first icon (S42). Next, the user operates the directional key 32 of the remote control 31 to move the cursor onto an icon display area 603, and presses the enter key 33 (S20: YES, S24: YES, S26: NO, and S34: YES). Hence, the position changing unit 26 moves, on the screen, the icon 404 designated as the first icon to the icon display area 603 (S36). After that, the image display control device 20 changes to the non-swap mode (S32). Such operations make it possible to move the icon to the empty area. It is noted that switchable icons shall not be limited to regular icons; instead, the switchable icons may be folder icons. In addition, an empty area shall not be limited to an icon display area on a page image; instead, the empty area may be the icon display area 410 found on the in-folder-icon image 403 and displaying no icon. For example, the icon 605 on the page image 205 can be moved to the icon display area 410 on the in-folder-icon image 403. Moreover, an icon can be moved within the page image 205, as well as within the in-folder-icon image 403.

[5. Changing the Name of a Folder Icon]

Figure 7:
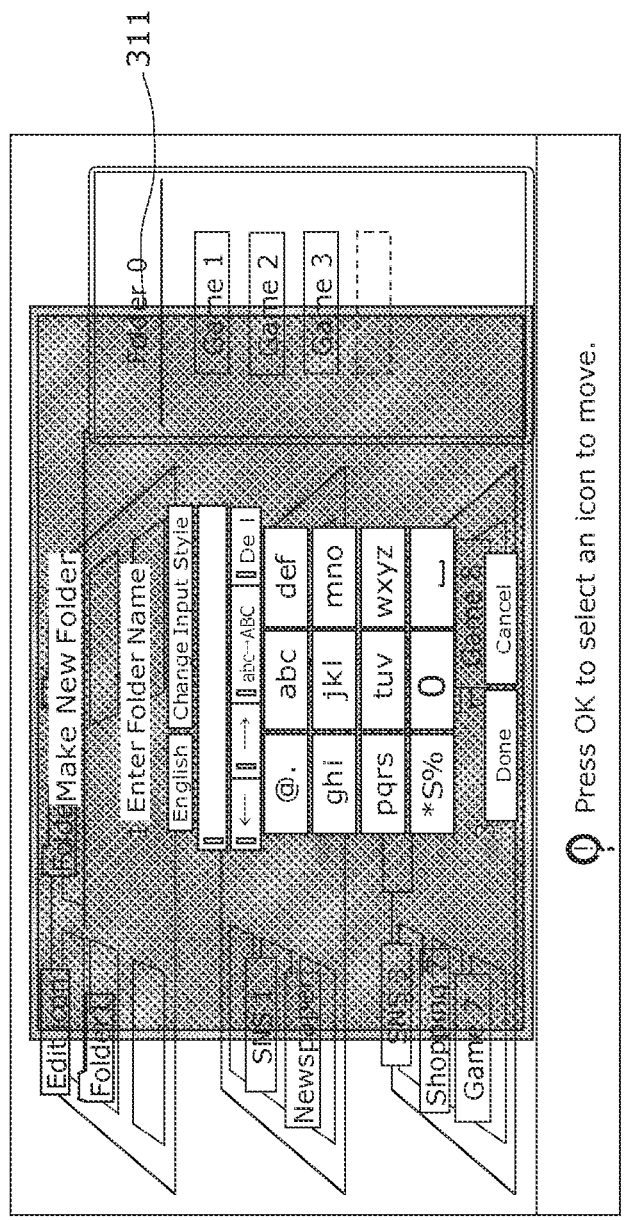
FIG. 7 represents an example of a name entering image.
Figure 13:
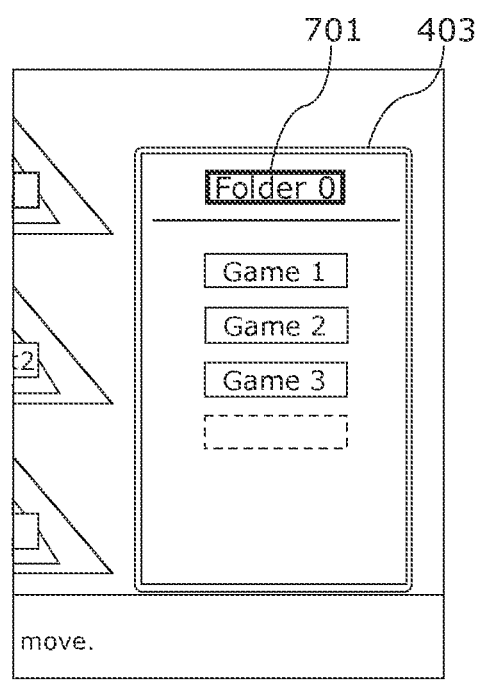
FIG. 13 represents an example of a screen when a cursor is placed on the name of a folder icon included in the in-folder-icon image.
Figure 14:
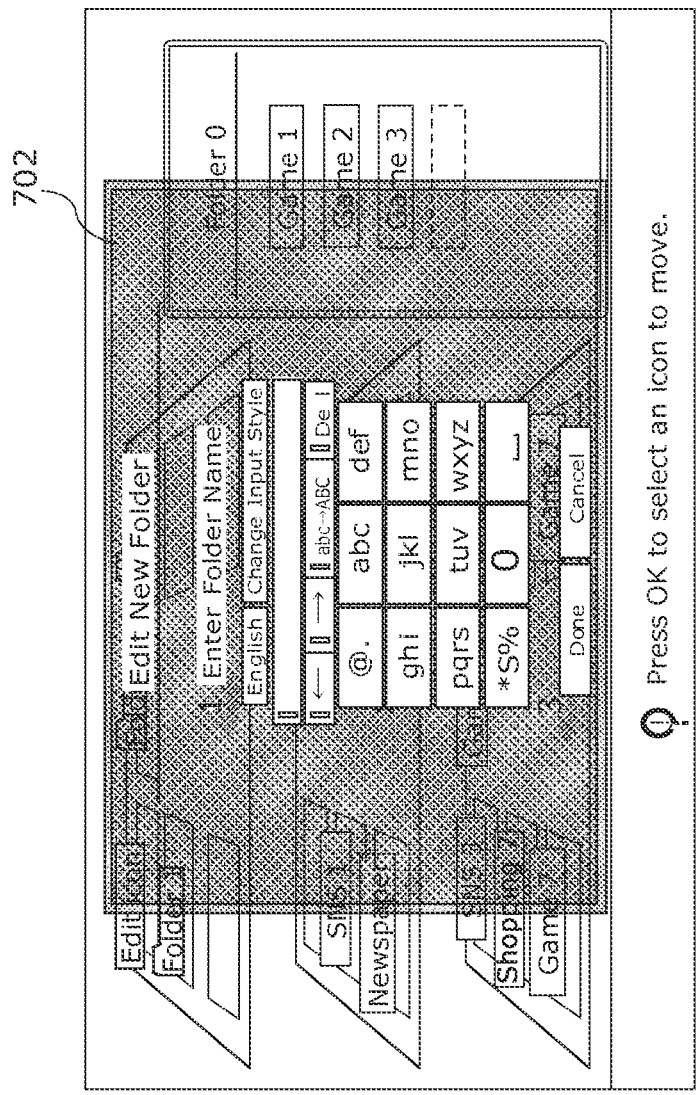
FIG. 14 represents an example of the name entering image.

A folder is named when the folder is made (FIG. 7 and S46 in FIG. 5C). For example, the user originally named a folder icon "Game" since the folder icon included multiple game-related icons. Then, the user might desire to change the name of the folder icon to "News" when the user changed the content of the folder icon from the game-related icons to a news-related icon. As FIG. 13 represents, when the user changes the name of a folder icon, the user operates the directional key 32 of the remote control 31 to move a cursor 701 to the name of the folder icon in the in-folder-icon image 403 (S2, S4: YES, and S6 in FIG. 5A). While the cursor 701 is on the name, the user presses the enter key 33 (S20: YES, S24: NO, S38: NO, S44: NO, S48: NO, and S52: YES). Then, the second display control unit 23 displays a name entering image 702 as represented in FIG. 14. The user can enter a name by operating the directional key 32 and the enter key 33 on the name entering image 702. The second display control unit 23 changes the name of the folder icon to the entered name (S54).

On the screen represented in FIG. 12, suppose the user operates the directional key 32 of the remote control 31 to move a cursor to the folder icon 602, and, while the cursor is on the folder icon 602, holds pressed the enter key 33 of the remote control 31 for a certain period of time or longer. Then, the deletion control unit 27 deletes the folder icon 602 and all the icons included in the folder icon 602 from the page image 204 and the in-folder-icon image 403.

It is noted that if the operation signal from the remote control 31 to the receiving unit 28 is the operation signal transmitted when the user presses a key other than the enter key 33 or the directional key 32 (S20: NO), executed is a process associated with a key which the user has pressed (S22). For example, if the user presses a TV program listing key of the remote control 31, the icon editing task is canceled and the screen displays a TV program listing.

[1-3. Effects Etc.]

As described above, in the embodiment, multiple page images and an in-folder-icon image are displayed on the screen. Such a feature makes it possible to display icons in different hierarchies on the same screen. Hence, the user can efficiently carry out an icon editing task.

In addition, the user can make a folder icon by simply operating a directional key to move a cursor to an icon display area with no icon displayed and pressing an enter key. Hence, the user can efficiently carry out an icon editing task using an input apparatus such as a remote control equipped with limited keys.

Furthermore, when the user selects an icon included in the icon list image, the folder icon including the selected icon is highlighted. Hence, the user can easily find out that the icon is included in which folder icon on which page image. Especially, in the case where a folder icon is not displayed on the screen of the display unit 30, such a feature saves the user the trouble of looking for the folder icon.

In addition, the user can switch the display positions of two icons through a simple operation to successively select the two icons. Hence, the user can efficiently change the display position of an icon using an input apparatus such as a remote control equipped with limited keys.

In addition, the user can move an icon through a simple operation to select an icon and then an empty area. Hence, the user can efficiently change the display position of an icon using an input apparatus such as a remote control equipped with limited keys.

Furthermore, the user can delete a folder icon by operating a directional key to move a cursor to the folder icon and then holding an enter key pressed. Hence, the user can efficiently delete a folder icon using an input apparatus such as a remote control equipped with limited keys.

Another Embodiment

The above-described embodiment exemplifies the art disclosed in the present application. The art in the present disclosure, however, shall not be limited to the embodiment. The art is applicable to another embodiment—that is the embodiment with appropriate change, replacement, addition, and omission made thereto. A new embodiment may also be implemented by a combination of each of the constituent elements described in the embodiment.

Exemplified below are other embodiments.

When the in-folder-icon image 403 is displayed as represented in FIG. 12, for example, suppose the user operates the directional key 32 of the remote control 31 to move a cursor to an icon in the page image, and, while the cursor is on the icon, holds pressed the enter key 33 of the remote control 31 for a certain period of time or longer. When the icon is the selected icon 604, the remote control 31 transmits an operation signal indicating an operation which keeps selecting the selected icon 604 for a certain period of time or longer. When the receiving unit 28 receives the operation signal, the position changing unit 26 may move the selected icon 604 to an icon display area 410 in the in-folder-icon image 403. Such features make it possible for the user to efficiently change the display position of an icon using an input apparatus such as a remote control equipped with limited keys.

As represented in FIG. 12, suppose the user operates the directional key 32 of the remote control 31 to move a cursor to the icon 404 in the in-folder-icon image 403, and, while the cursor is on the icon 404, holds pressed the enter key 33 of the remote control 31 for a certain period of time or longer. The remote control 31 transmits an operation signal indicating an operation which keeps selecting the icon 404 for a certain period of time or longer. When the receiving unit 28 receives the operation signal, the position changing unit 26 may move the icon 404 to an icon display area (for example, the icon display area 603) found on any given page image and displaying no icon. Hence, the user can efficiently change the display position of an icon using an input apparatus such as a remote control equipped with limited keys.

In the above description, examples of the operation that holds pressed the enter key 33 for a certain period of time or longer may include an operation which double-taps the enter key 33.

In addition, a folder icon may include another folder icon. Here, when the user selects a folder icon in the in-folder-icon image 403, for example, the second display control unit 23 further displays on the screen another in-folder-icon image 403 for displaying an icon included in the selected folder icon. In other words, two in-folder-icon images 403 may be displayed on the screen. Such a feature allows the user to switch the display positions of icons and move an icon over three or more hierarchies.

When icons significantly increase in number, the user has to press the directional key 32 very frequently to move a cursor to a desired icon, which could be greatly troublesome to the user. Hence, the image display control device 20 may predict an icon to be chosen next as soon as the image display control device 20 changes to the swap mode, scroll and display a page image or an in-folder-icon image, and automatically move a cursor to the predicted icon. If the prediction is right, such a feature allows the user to switch positions of icons by simply pressing the enter key 33 of the remote control 31. For example, as soon as a game-related icon in the in-folder-icon image is selected, the image display control device 20 may move the cursor to an icon of any given game in the page image including the most game-related icons. Such a feature contributes to eliminating troubles relating to scrolling by the user if the prediction is right.

Moreover, the position changing unit 26 may automatically rearrange icons based on the attributes of icons. For example, the position changing unit 26 may automatically rearrange icons as much as possible so that game-related icons are placed on the same page or pages close to each other.

In the above embodiment, the image display control device 20 may include, but not be limited to, one of the following application-executable devices: a recording appliance such as a hard-disk drive recorder, a TV, and a personal digital assistance. For example, the image display control device 20 may be one of the following devices that are capable of reproducing content such as recorded video: a recording appliance such as a hard-disk drive recorder, a TV, and a personal digital assistance. Here, each of the icons is associated with a corresponding one of content files.

In the above embodiment, an exemplary icon displayed on the screen of the display unit 30 indicates a downloaded application; instead, the exemplary icon may indicate an application previously stored in the image display control device 20.

Specifically, the image display control device 20 may be a computer system including a microprocessor, a ROM, a RAM, a hard disk drive, a display unit, a keyboard, a mouse. The RAM or hard disk drive stores a computer program. The image display control device 20 achieves its functions through the microprocessor's operation according to the computer program. Here, the computer program is configured by combining instruction codes indicating instructions to the computer.

A part or all of the constituent elements constituting the image display control device 20 may be configured from a single System-LSI (Large-Scale Integration). The System-LSI is a super-multi-function LSI manufactured by integrating constituent units on one chip. Specifically, the System-LSI is a computer system including a microprocessor, a ROM, and a RAM. The RAM stores a computer program. The System-LSI performs its functions through the microprocessor's operation according to the computer program.

A part or all of the constituent elements included in the image display control device 20 may be configured as an IC card which can be attached to and detached from the image display control device 20 or as a stand-alone module. The IC card or the module is a computer system configured from a microprocessor, a ROM, and a RAM. The IC card or the module achieves its function through the microprocessor's operation according to the computer program. The IC card or the module achieves its function through the microprocessor's operation according to the computer program. The IC card or the module may also be tamper-resistant.

The present disclosure may be implemented in the form of the above-described method. The present disclosure may be a computer program for implementing the above method on a computer, and may also be a digital signal including the computer program.

The present disclosure may also be implemented in the form of the computer program or the digital signal stored in a non-transitory computer-readable recording medium such as a flexible disc, a hard disk, a CD-ROM, an MO, a DVD, a DVD-ROM, a DVD-RAM, a BD (Blu-ray Disc®), and semiconductor memory. The present disclosure may be the above digital signal recorded on the computer non-transitory computer-readable recording medium.

The present disclosure may also be implemented in the form of the aforementioned computer program or digital signal transmitted via a telecommunication line, a wireless or wired communication line, a network represented by the Internet, data broadcast, and so on.

The disclosure may also be a computer system including a microprocessor and a memory, in which the memory stores the aforementioned computer program and the microprocessor operates according to the computer program.

The above program or the above digital signal may be recorded on the above non-transitory computer-readable recording media for their transportation or transmitted via the above network and so on in order to be utilized on another independent computer system.

It is noted that the essential constituent elements for an image display control device according to the present disclosure are the first display control unit 22, the receiving unit 28, and the second display control unit 23 included in the image display control device 20 represented in FIG. 1. The other constituent elements do not have to be included in the image display control device.

As described above, an embodiment has been described as an exemplary technique disclosed in the present disclosure. The embodiment is supported by the attached drawings and the detailed descriptions.

Hence, the constituent elements disclosed in the attached drawings and the detailed description include not only mandatory constituent elements for solutions to the problems, but also merely optional constituent elements for solutions to the problems to exemplify the above technique. Thus, persons skilled in the art shall not determine that the merely optional constituent elements in the attached drawings and the detailed description are essential.

The embodiment exemplifies the technique in the present disclosure, and shall include various kinds of modifications, replacements, additions, and omissions which are equivalent to and within the scope of the claims.

INDUSTRIAL APPLICABILITY

The present disclosure is applicable to one of the following application-executable or content-reproducible devices: a recording appliance such as a hard-disk drive recorder, a TV, and a personal digital assistance. In particular, the present disclosure is applicable to an image display control device which user operates using an input apparatus equipped with limited keys.

REFERENCE SIGNS LIST

10 Image display system
20 Image display control device
21 Control unit
22 First display control unit
23 Second display control unit
24 Third display control unit
25 Fourth display control unit
26 Position changing unit 26
27 Deletion control unit
28 Receiving unit
29 Network connecting unit
30 Display unit
31 Remote control
32 Directional key
33 Enter key
101 to 108, 202, 207 to 213, 404, 406, 408, 604, and 605 Icon
111 and 112 Button
201 Icon list image
203 Check box
204 to 206 Page image
301, 401, 405, 501, and 701 Cursor
311 and 702 Name entering image
402 and 602 Folder icon
403 In-folder-icon image
410 and 603 Icon display area

The invention claimed is:

1. An image display control device comprising:
a processor that executes instructions contained in a memory for causing the image display device to operate at least as:
a first display control unit configured to display, on a screen, page images on each of which an icon is displayed;
a receiving unit configured to receive an operation signal indicating a user operation directed to one of the icons displayed on the screen;
a second display control unit configured to display, on one screen, both an in-folder-icon image and a plurality of the page images at the same time when the receiving unit receives an operation signal for selecting a folder icon, from among a plurality of the icons displayed on the page images, including one or more of the icons lower in hierarchy than the folder icon, the in-folder-icon image presenting the one or more icons included in the selected folder icon, the page images including a page image on which the selected folder icon is displayed; and
a position changing unit configured to
switch a first display position of a first icon on the screen with a second display position of a second icon on the screen when the receiving unit successively receives (i) a first operation signal for selecting the first icon, the first operation signal causing the image display control device to change from a non-swap mode, in which the icons displayed on the screen cannot be switched, to a swap mode, in which the icons displayed on the screen can be switched, and (ii) a second operation signal for selecting the second icon after receiving the first operation signal for selecting the first icon, and
display, after receiving the second operation signal, (i) the first icon at the second display position at which the second icon is displayed immediately before the first operation signal is received and (ii) the second icon at the first display position at which the first icon is displayed immediately before the first operation signal is received,
wherein the first display position of the first icon is fixed during a period of time from (i) when the receiving unit receives the first operation signal to (ii) when the receiving unit receives the second operation signal.

2. The image display control device according to claim 1, wherein the page images each include icon display areas for displaying the icons, the position changing unit is further configured to move, on the screen, one of the icons to one of the icon display areas which displays no icon, when the receiving unit receives an operation signal for selecting the one icon and then the one icon display area.

3. The image display control device according to claim 1, wherein the position changing unit is further configured to move, on the screen, one of the icons to the in-folder-icon image, when the receiving unit receives an operation signal indicating an operation which keeps selecting the one icon for a certain period of time or longer, the icons being displayed in the page images while the in-folder-icon image is displayed.

4. The image display control device according to claim 1, wherein the position changing unit is further configured to move, on the screen, one of the icons to one of the icon display areas which displays no icon, when the receiving unit receives an operation signal indicating an operation which keeps selecting the one icon in the in-folder-icon image for a certain period of time or longer.

5. The image display control device according to claim 1, further comprising:
a third display control unit configured to display, on the screen, an icon list image presenting a list of the icons displayable on the screen and including icons identical to the plurality of icons displayed in the page images, the first icon and the second icon being displayed in the page images and in the icon list image.

* * * * *

UNITED STATES PATENT AND TRADEMARK OFFICE
CERTIFICATE OF CORRECTION

PATENT NO. : 10,642,444 B2
APPLICATION NO. : 14/357252
DATED : May 5, 2020
INVENTOR(S) : Toshiyuki Tanaka Page 1 of 1

It is certified that error appears in the above-identified patent and that said Letters Patent is hereby corrected as shown below:

On the Title Page

In Item (87), Line 1, "WO2013/009054" should read --WO2013/099054--

Signed and Sealed this
Eighteenth Day of August, 2020

Andrei Iancu
*Director of the United States Patent and Trademark Office*